United States Patent [19]

Wölber

[11] 3,803,447

[45] Apr. 9, 1974

[54] CIRCUIT ARRANGEMENT FOR GENERATING A SAWTOOTH CURRENT FOR THE HORIZONTAL DEFLECTION IN TELEVISION DISPLAY APPARATUS

[75] Inventor: Jörg Wölber, Hamburg, Germany

[73] Assignee: U.S. Philips Corporation, New York, N.Y.

[22] Filed: Mar. 31, 1972

[21] Appl. No.: 240,013

[30] Foreign Application Priority Data

Apr. 29, 1971 Germany........................... 2121037

[52] U.S. Cl. ............................................. 315/27 SR

[51] Int. Cl. ........................................... H01j 29/70

[58] Field of Search.......... 315/27 R, 27 TD, 27 SR, 315/28, 29; 178/7.5 R

[56] References Cited

UNITED STATES PATENTS 3,440,485 4/1969 Nix et al........................ 315/27 TD 3,517,253 6/1970 Dietz................................ 315/27 R 2,906,919 9/1959 Thor et al. ...................... 315/27 SR

*Primary Examiner*—Maynard R. Wilbur

*Assistant Examiner*—J. M. Potenza

*Attorney, Agent, or Firm*—Frank R. Trifari; Henry I. Steckler

[57] ABSTRACT

In a circuit arrangement for the horizontal deflection in television display apparatus using two switches (thyristors), a coil is used to compensate for energy losses in which the energy consumption is controlled by means of a transductor in order to maintain the amplitude of the deflection constant. The functions of the coil and of the control transductor are formed by one transductor whose leg on which the coil is wound has an airgap.

5 Claims, 2 Drawing Figures

CIRCUIT ARRANGEMENT FOR GENERATING A SAWTOOTH CURRENT FOR THE HORIZONTAL DEFLECTION IN TELEVISION DISPLAY APPARATUS

The invention relates to a circuit arrangement for generating a sawtooth current for the horizontal deflection in television display apparatus in which a first switch is operative during the line scan period and a second switch is operative during the line flyback period, a current being applied through a coil for implementing losses, while the power winding of a transductor is arranged in parallel with said coil for controlling the energy consumption.

Such a circuit arrangement is known from U.S. Pat. No. 3,517,253. In this arrangement the said coil and the control transductor are separate elements. As a result a fairly large quantity of material is required and furthermore additional stray fields are to be taken into the bargain which cause losses and disturb the function of other parts in the deflection circuit.

These drawbacks of the known circuit arrangement may be obviated in a simple manner according to the invention and to this end the circuit arrangement according to the invention is characterized in that the coil and the power winding of the transductor are each wound on an outer leg, and the control winding of the transductor is wound on the central leg of a three-legged core of magnetic material.

Figure 1:
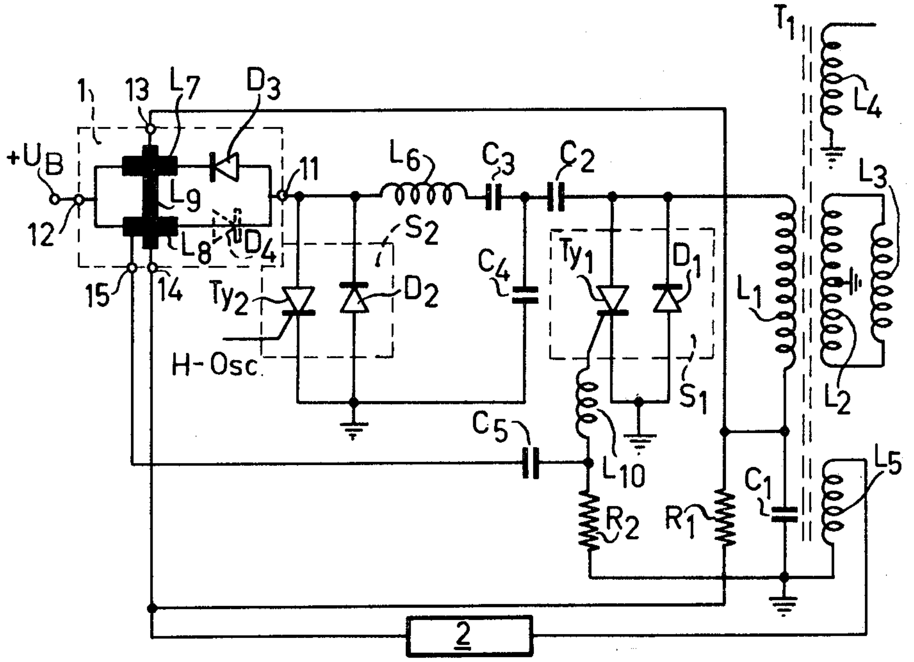
Figure 2:
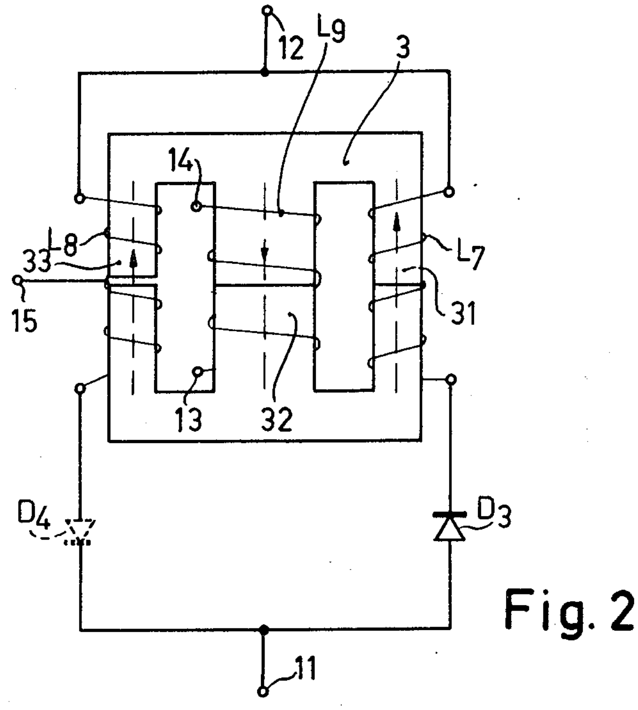

In order that the invention may be readily carried into effect, an embodiment thereof will now be described in detail by way of example, with reference to the accompanying diagrammatic drawing in which FIG. 1 shows the principle circuit diagram of the arrangement according to the invention and FIG. 2 shows an embodiment of the element formed by the coil and the transductor.

In FIG. 1 a primary winding $L_1$, a secondary winding $L_2$ to which the deflection coil $L_3$ is connected, an EHT winding $L_4$ and a further secondary winding $L_5$ are provided on the line deflection transformer $T_1$ of a television display apparatus not further shown. The low end of primary winding $L_1$ is connected to the S-capacitor $C_1$ the other terminal of which is connected to earth. The high end of primary winding $L_1$ is connected to the anode of a first thyristor $T_1$ and to the cathode of a first diode $D_1$, while the cathode of thyristor $Ty_1$ and the anode of diode $D_1$ are connected to earth. Elements $Ty_1$ and $D_1$ constitute a switch $S_1$ which is conducting during the line scan period. Furthermore the high end of primary winding $L_1$ is connected through capacitor $C_2$ and $C_3$ and through an inductor $L_6$ to a connection point 11 of a magnetic element 1 to be described hereinafter. The anode of a second thyristor $Ty_2$ and the cathode of a second diode $D_2$ are likewise connected to connection point 11 while the cathode of thyristor $Ty_2$ and the anode of diode $D_2$ are connected to earth. Elements $Ty_2$ and $D_2$ constitute a switch $S_2$ which is conducting during the line flyback period. The junction of capacitors $C_2$ and $C_3$ is connected to earth through a further capacitor $C_4$.

The power windings $L_7$ and $L_8$ of magnetic element 1 are jointly connected at one end through a connection 12 to the positive terminal of a voltage source $U_B$, while the other end of the power winding $L_8$ is connected through a diode $D_4$ shown in broken lines and the other end of power winding $L_7$ is connected through a diode $D_3$ to connection point 11, the conductivity direction of the diodes being shown in FIG. 1. A connection 13 of the control winding $L_9$ is connected at one end to the junction of primary winding $L_1$ and $C_1$ and at the other end to a connection of a resistor $R_1$ the other connection of which is coupled to the other connection 14 of control winding $L_9$. Control winding $L_9$ receives a control current in known manner through the control amplifier 2 not further described, which current is dependent on the voltage induced in winding $L_5$: this control current is therefore dependent on possible variations of the alternating voltage across winding $L_1$. Resistor $R_1$ damps parasitic oscillations, if any. Thyristor $Ty_1$ is controlled by a control voltage which is derived from power winding $L_8$ through a tap 15 and is applied to the gate of thyristor $Ty_1$ through a capacitor $C_5$, a resistor $R_2$ and an inductor $L_{10}$. The gate of thyristor $Ty_2$ is connected to the line oscillator.

During the line scan period switch $S_1$ conducts and the deflection current oscillates in known manner in the circuit constituted by elements $L_1$ and $C_1$. However, during the line flyback period switch $S_2$ conducts and switch $S_1$ is cut off. During this period elements $L_1$ and $C_1$ are arranged in series with elements $C_2$, $C_3$ and $L_6$. A half oscillation occurs in this circuit during the flyback period. Simultaneously a current flows from voltage source $U_B$ through winding $L_8$ and through switch $S_2$ to earth. The energy then stored in winding $L_8$ is used for charging capacitor $C_2$ and $C_3$ during the scan period when switch $S_1$ conducts and switch $S_2$ is cut off so that the losses in the deflection circuit are implemented.

The amplitude of the deflection current depends on the voltages which are present at the end of the scan period across capacitors $C_2$, $C_3$ and $C_4$. By varying the inductance of the parallel arrangement of windings $L_7$ and $L_8$ these voltages and consequently the amplitude of the deflection current can be controlled. In the known circuit arrangement this variation is achieved in that the power winding of a transductor is arranged in parallel with winding $L_8$ which is present as an independent element, while a control current flows through the control winding of the transductor.

According to the invention the function of winding $L_8$ and of said transductor can be combined advantageously in one element as is shown in FIG. 1 and as will be described in greater detail with reference to FIG. 2. For components shown in FIG. 1 the same reference numerals have been used in FIG. 2.

Windings $L_7$ and $L_8$ are provided on the outer legs 31 and 33 of a core 3 of magnetic material while the central leg 32 supports control winding $L_9$. An airgap is provided on leg 33. When the control current in control winding $L_9$ is directed from connection 13 to connection 14, windings $L_7$, $L_8$ and $L_9$ must have the winding sense shown in FIG. 2. As a result the induction flux in the legs 31 and 33 generated by the currents in windings $L_7$ and $L_8$ is increased by the flux generated by the control current in leg 32. This is shown in greater detail by means of broken lines in FIG. 2.

During the line flyback period switch $S_2$ conducts and a current flows from connection 12 through winding $L_8$ which generates a magnetic field in leg 33. Energy is stored in this winding. Current cannot flow during the flyback period in winding $L_7$ because diode $D_3$ is then blocked.

During the line scan period switch $S_1$ conducts and switch $S_2$ is blocked. The resonant network consisting of elements $L_8$, $L_6$, $C_2$, $C_3$ and $C_4$ is then connected between supply voltage $U_B$ and ground. Since the energy is stored in winding $L_8$, capacitor $C_2$, $C_3$ and $C_4$ are being charged. When the voltage of these capacitors has become so high that the voltage at connection 11 exceeds the voltage at connection 12, diode $D_3$ becomes conducting and a current originating from winding $L_8$ flows through winding $L_7$. By varying the control current it is possible to vary the inductance of winding $L_7$ so that also the inductance of the parallel arrangement of windings $L_8$ and $L_7$ varies. This results in a variation of the voltage at the capacitors $C_2$, $C_3$ and $C_4$ at the end of the line scan period and consequently in a variation of the amplitude of the deflection current.

It is achieved by the airgap in leg 33 that the control current flowing through winding $L_9$ does not noticeably influence the inductance of winding $L_8$ during the flyback period and as long as diode $D_3$ does not conduct. When a current flows through winding $L_7$ the inductance of the parallel arrangement of windings $L_7$ and $L_8$ is a function of that of winding $L_7$ and therefore varies as a function of the control current.

It is apparent from the foregoing that the direct current taken up by the arrangement, which current flows through diode $D_4$ which is arranged in series with winding $L_8$, continues to flow in the same direction so that the diode is maintained conducting. Diode $D_4$ may therefore be omitted.

The magnetic core 3 having an airgap in outer leg 33 may be manufactured in an advantageous manner by inserting an intermediate layer consisting of magnetic material into legs 31 and 32 when two E-shaped core parts are combined. If only one part of the cross-section of leg 31 is filled with magnetic material the intermediate layer is saturated when the magnetising current initially increases and the other part of the core is saturated when the magnetising current further increases. As a result a continuous transition from the unsaturated state to saturation in leg 31 takes place (the knee in the B-H curve thereof is rounded off) so that the inductance of winding $L_7$ can be controlled continuously. Alternatively the airgap may be obtained by shortening only one of the parts of leg 33 in an E-shaped core, which is cheaper than shortening both parts.

What is claimed is:

1. A circuit for energizing a deflection system from a power source in accordance with a control signal, said circuit comprising a transductor having a central and first and second outer legs; means for storing energy during flyback periods comprising a first coil wound about said first leg and a first switching means coupled to said first coil and conducting during said flyback periods for coupling said first coil to said power source during said flyback periods; means for energizing said deflection system during scan periods comprising a second switching means conducting during said scan periods and coupled to said first winding for coupling said first winding to said deflection system during said scan periods and for effecting energy transfer from said first winding to said deflection system; and means for controling the amount of said energy transfer comprising a second power coil wound about said second leg and coupled to said first coil, and a control coil means wound about said center leg for receiving said control signal.

2. A circuit as claimed in claim 1 wherein said first leg has a gap.

3. A circuit as claimed in claim 2, wherein said transductor comprises two E-shaped cores and a pair of intermediate layers each comprising a magnetic material disposed between the two parts of the central and second outer legs respectively.

4. A circuit as claimed in claim 3, wherein the intermediate layer in the second outer leg fills only a part of the cross-section of said leg.

5. A circuit as claimed in claim 2, wherein said transductor comprises two E-shaped cores, each of said legs having two parts, at least one of the two parts of the first outer leg being shorter than the parts of the remaining legs, whereby said gap is formed.

* * * * *

PO-1050
(5/69)

UNITED STATES PATENT OFFICE
CERTIFICATE OF CORRECTION

Patent No. 3,803,447 Dated April 9, 1974

Inventor(s) JORG WOLBER

It is certified that error appears in the above-identified patent and that said Letters Patent are hereby corrected as shown below:

ON THE TITLE PAGE below "Foreign Application Priority Data" cancel "2121037" and insert -- P.2121037.7 --;

Signed and sealed this 13th day of August 1974.

(SEAL)
Attest:

McCOY M. GIBSON, JR.
Attesting Officer

C. MARSHALL DANN
Commissioner of Patents